(12) United States Patent
Williams

(10) Patent No.: US 12,545,154 B2
(45) Date of Patent: Feb. 10, 2026

(54) SAFETY SEAT HAVING A SPIN LOCK

(71) Applicant: Wonderland Switzerland AG, Steinhausen (CH)

(72) Inventor: Bruce L. Williams, Narvon, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/654,636

(22) Filed: May 3, 2024

(65) Prior Publication Data

US 2024/0286536 A1 Aug. 29, 2024

Related U.S. Application Data

(63) Continuation of application No. 18/431,027, filed on Feb. 2, 2024, now Pat. No. 12,311,814, which is a continuation of application No. 18/154,518, filed on Jan. 13, 2023, now Pat. No. 12,139,055, which is a continuation of application No. 16/991,764, filed on Aug. 12, 2020, now Pat. No. 11,565,612.

(60) Provisional application No. 62/947,239, filed on Dec. 12, 2019.

(51) Int. Cl.
*B60N 2/28* (2006.01)
*B60N 2/90* (2018.01)

(52) U.S. Cl.
CPC ........... *B60N 2/2869* (2013.01); *B60N 2/919* (2018.02); *B60N 2/2821* (2013.01); *B60N 2002/952* (2018.02)

(58) Field of Classification Search
None
See application file for complete search history.

(56) References Cited

U.S. PATENT DOCUMENTS

| | | | |
|---|---|---|---|
| 5,022,669 A | 6/1991 | Johnson |
| 5,033,669 A | 7/1991 | Federico |
| 6,139,101 A | 10/2000 | Berringer |
| 6,260,920 B1 | 7/2001 | Tofsen |
| 6,367,875 B1 | 4/2002 | Bapst |

(Continued)

FOREIGN PATENT DOCUMENTS

| | | |
|---|---|---|
| CN | 1388784 A | 1/2003 |
| CN | 201124777 Y | 10/2008 |

(Continued)

OTHER PUBLICATIONS

"Non-Final Office Action for U.S. Appl. No. 18/613,983", Mailed Date: May 15, 2024, 31 pages.

(Continued)

*Primary Examiner* — Anthony D Barfield
(74) *Attorney, Agent, or Firm* — Volpe Koenig

(57) ABSTRACT

A safety seat that includes a first base, a second base positioned on the first base and rotatable relative to the first base about an axis, a seat positioned on the second base and rotatable relative to the first base about the axis, and a lock disposed on the second base. The lock has a movable lock component configured to lock the first base with the second base. The safety seat further includes an actuator configured to disengage the movable lock component from the first base and permit the second base to rotate relative to the first base, and a link comprising a first end and a second end, the link extending between the movable lock component and the actuator. The first end contacts the movable lock component and the second end contacts the actuator.

30 Claims, 5 Drawing Sheets

(56) References Cited

U.S. PATENT DOCUMENTS

| | | |
|---|---|---|
| 7,073,859 B1 | 7/2006 | Wilson |
| 7,338,122 B2 | 3/2008 | Hei et al. |
| 7,357,451 B2 | 4/2008 | Bendure |
| 7,481,492 B2 | 1/2009 | Lhomme et al. |
| 8,651,572 B2 | 2/2014 | Medeiros et al. |
| 8,955,915 B2 | 2/2015 | Mason |
| 9,090,182 B2 | 7/2015 | Rabeony |
| 9,873,359 B2 | 1/2018 | Williams |
| 10,322,651 B2 | 6/2019 | Hutchinson et al. |
| 10,457,168 B2 | 10/2019 | Anderson et al. |
| 10,688,892 B2 | 6/2020 | Anderson et al. |
| 11,565,612 B2 | 1/2023 | Williams |
| 2002/0145319 A1 | 10/2002 | Tsugimatsu et al. |
| 2002/0163232 A1 | 11/2002 | Vezinet et al. |
| 2002/0195849 A1 | 12/2002 | Bedard |
| 2005/0151402 A1 | 7/2005 | Balensiefer |
| 2005/0253431 A1 | 11/2005 | Hei et al. |
| 2005/0264064 A1 | 12/2005 | Hei et al. |
| 2007/0046087 A1 | 3/2007 | Nakagawa |
| 2008/0224516 A1 | 9/2008 | Vegt |
| 2009/0091167 A1 | 4/2009 | Jha et al. |
| 2011/0109137 A1 | 5/2011 | Tamanouchi et al. |
| 2011/0109138 A1 | 5/2011 | Inoue et al. |
| 2012/0326474 A1 | 12/2012 | Williams |
| 2014/0084650 A1 | 3/2014 | Rabeony |
| 2016/0176320 A1 | 6/2016 | Williams |
| 2018/0264977 A1 | 9/2018 | Anderson et al. |
| 2021/0178938 A1 | 6/2021 | Williams |
| 2021/0237626 A1 | 8/2021 | Longenecker et al. |
| 2022/0355713 A1 | 11/2022 | Longenecker et al. |
| 2023/0014310 A1 | 1/2023 | Longenecker et al. |
| 2023/0256875 A1 | 8/2023 | Zhang |
| 2024/0149767 A1 | 5/2024 | Lee et al. |
| 2024/0255017 A1 | 8/2024 | Raybern |

FOREIGN PATENT DOCUMENTS

| | | |
|---|---|---|
| CN | 101734178 A | 6/2010 |
| CN | 104859493 A | 8/2015 |
| CN | 204623214 U | 9/2015 |
| CN | 105172623 A | 12/2015 |
| CN | 107512204 A | 12/2017 |
| CN | 108349412 A | 7/2018 |
| CN | 110466399 A | 11/2019 |
| DE | 69719540 T2 | 12/2003 |
| EP | 2701944 B1 | 7/2015 |
| GB | 1184181 A | 3/1970 |
| GB | 2207043 A | 1/1989 |
| TW | 338022 B | 8/1998 |
| TW | M267103 U | 6/2005 |
| TW | I775222 B | 8/2022 |
| WO | 0208013 A1 | 1/2002 |

OTHER PUBLICATIONS

"Final Office Action for U.S. Appl. No. 16/991,764", Mailed Date: May 27, 2022, 15 pages.
"Final Office Action for U.S. Appl. No. 18/154,518", Mailed Date: Oct. 23, 2023, 14 pages.
"Final Office Action for U.S. Appl. No. 18/154,518", Mailed Date: Jun. 6, 2024, 20 pages.
"Non-Final Office Action for U.S. Appl. No. 16/991,764", Mailed Date: Feb. 17, 2022, 13 pages.
"Non-Final Office Action for U.S. Appl. No. 18/154,518", Mailed Date: Apr. 26, 2023, 13 pages.
"Non-Final Office Action for U.S. Appl. No. 18/154,518", Mailed Date: Feb. 16, 2024, 17 pages.
"Notice of Allowance and Fees Due for U.S. Appl. No. 16/991,764", Mailed Date: Sep. 28, 2022, 10 pages.
"International Search Report for PCT Patent Application No. PCT/EP2020/084493", Mailed Date: Mar. 11, 2021, 10 pages.
International Search Report issued to PCT Application No. PCT/EP2020/084493 dated Mar. 11, 2021.
First Chinese Office Action and Search Report; Chinese Application No. 2020108299888; Date: Aug. 24, 2022; 18 pages with translation.
Taiwan Office Action; Taiwan Application No. 111128298; Date: Nov. 8, 2022; 13 pages with translation.
Office Action issued in corresponding Taiwanese Application No. 112147296 dated Mar. 14, 2024. English Machine Translation Included.
Final Office Action issued in corresponding U.S. Appl. No. 18/613,983 dated Sep. 5, 2024.
U.S. Appl. No. 18/434,027 Non-Final Office Action issued in corresponding U.S. Appl. No. 18/431,027 dated Sep. 24, 2024.
Notice of Allowance issued in corresponding U.S. Appl. No. 18/154,518 dated Sep. 29, 2024.
Supplemental Notice of Allowability for corresponding U.S. Appl. No. 18/154,518 dated Nov. 18, 2024, 6 pages long.
Applicant-Initiated Interview Summary for corresponding U.S. Appl. No. 18/431,027 dated Jan. 6, 2025, 3 pages long.
Non-Final Office Action for corresponding U.S. Appl. No. 18/431,027 dated Sep. 24, 2024, 30 pages long.
Final Office Action for corresponding U.S. Appl. No. 18/613,983 dated Sep. 5, 2024, 34 pages long.

SAFETY SEAT HAVING A SPIN LOCK

CROSS-REFERENCE TO RELATED APPLICATIONS

This application is a Continuation of U.S. Non-Provisional application Ser. No. 18/431,027, filed on Feb. 2, 2024, now U.S. Pat. No. 12,311,814, which is a Continuation of U.S. Non-Provisional application Ser. No. 18/154,518, filed on Jan. 13, 2023, now U.S. Pat. No. 12,139,055 which is a Continuation of U.S. Non-Provisional application Ser. No. 16/991,764, filed Aug. 12, 2020, now U.S. Pat. No. 11,565,612, issued on Jan. 31, 2023, which claims the benefit of U.S. Provisional Application No. 62/947,239, filed Dec. 12, 2019, the disclosures of which are incorporated herein by reference in their entirety.

FIELD

The disclosure relates to a child safety seat, and more particularly, to a child restraint spin lock for use with a safety seat of a vehicle.

BACKGROUND

Many conventional child restraint systems in the market come with child's seats that are rotatable while being installed in a vehicle for enhanced functionality. Such conventional child restraint systems usually include spin lock mechanisms to position the seats in a rear facing position or a forward facing position. However, the spin lock mechanisms used in the conventional child restraint systems have been found to be overly complex and may lack adequate spin lock retention in the event of a vehicle crash.

SUMMARY

Therefore, the object of the disclosure is to provide a child restraint spin lock and a safety seat having the same that allow for ease of use, and that provide improved retention in the event of a vehicle crash.

According to one aspect of the disclosure, a child restraint spin lock is adapted to be installed in a safety seat of a vehicle. The safety seat includes a base member that has two lock sections being spaced apart from each other, and a mid base that is mounted to the base member and that is rotatable relative to the base member about an axis.

The child restraint spin lock includes two locking components and a pivot component.

The locking components are adapted to be co-rotatably connected to the mid base, and are spaced apart from each other. Each of the locking components has a first end portion and a second end portion that are respectively proximate to and distal from the axis. Each of the locking components is adapted to be movable relative to the base member between a locked position, where the second end portion of each of the locking components is adapted to be engaged with a respective one of the lock sections of the base member such that the mid base is not allowed to rotate relative to the base member, and an unlocked position, where the second end portion of each of the locking components is adapted to be disengaged from the respective one of the lock sections of the base member.

The pivot component is adapted to be connected to the mid base, is rotatable relative to the mid base about the axis, and has two end segments. Each of the end segments is pivotally connected to the first end portion of a respective one of the locking components such that movements of the locking components from the locked position to the unlocked position are synchronized by rotation of the pivot component about the axis.

According to another aspect of the disclosure, a safety seat includes a seat unit and the child restraint spin lock mentioned above.

The seat unit includes a base member, a mid base and a seat member. The base member has two first lock sections that are spaced apart from each other. The mid base is mounted to the base member and is rotatable relative to the base member about an axis. The seat member is mounted atop the mid base and is co-rotatable with the mid base about the axis. The above-mentioned child restraint spin lock is installed in the seat unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
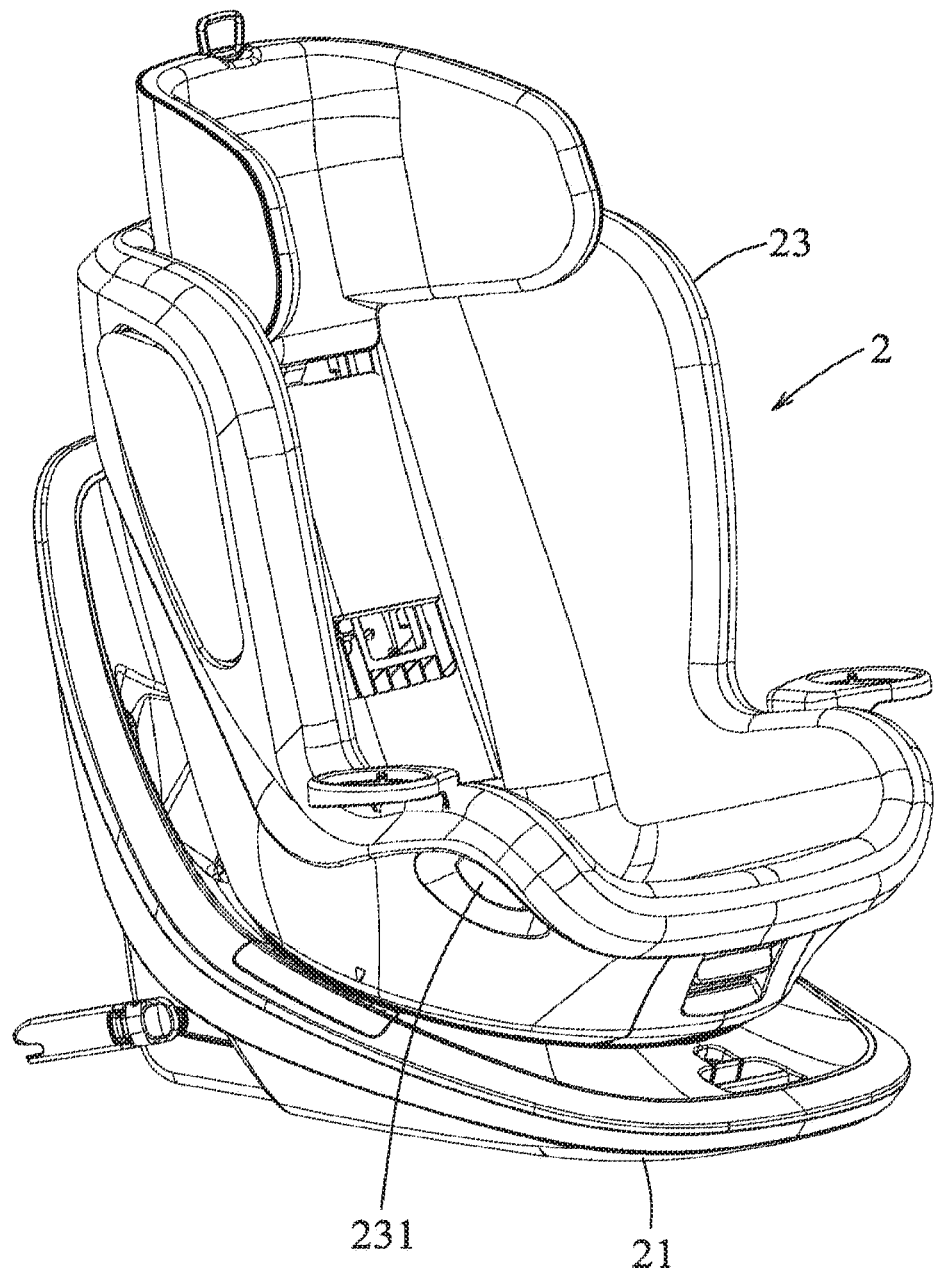
FIG. 1 is a perspective view of an embodiment of a safety seat according to the disclosure.
Figure 2:
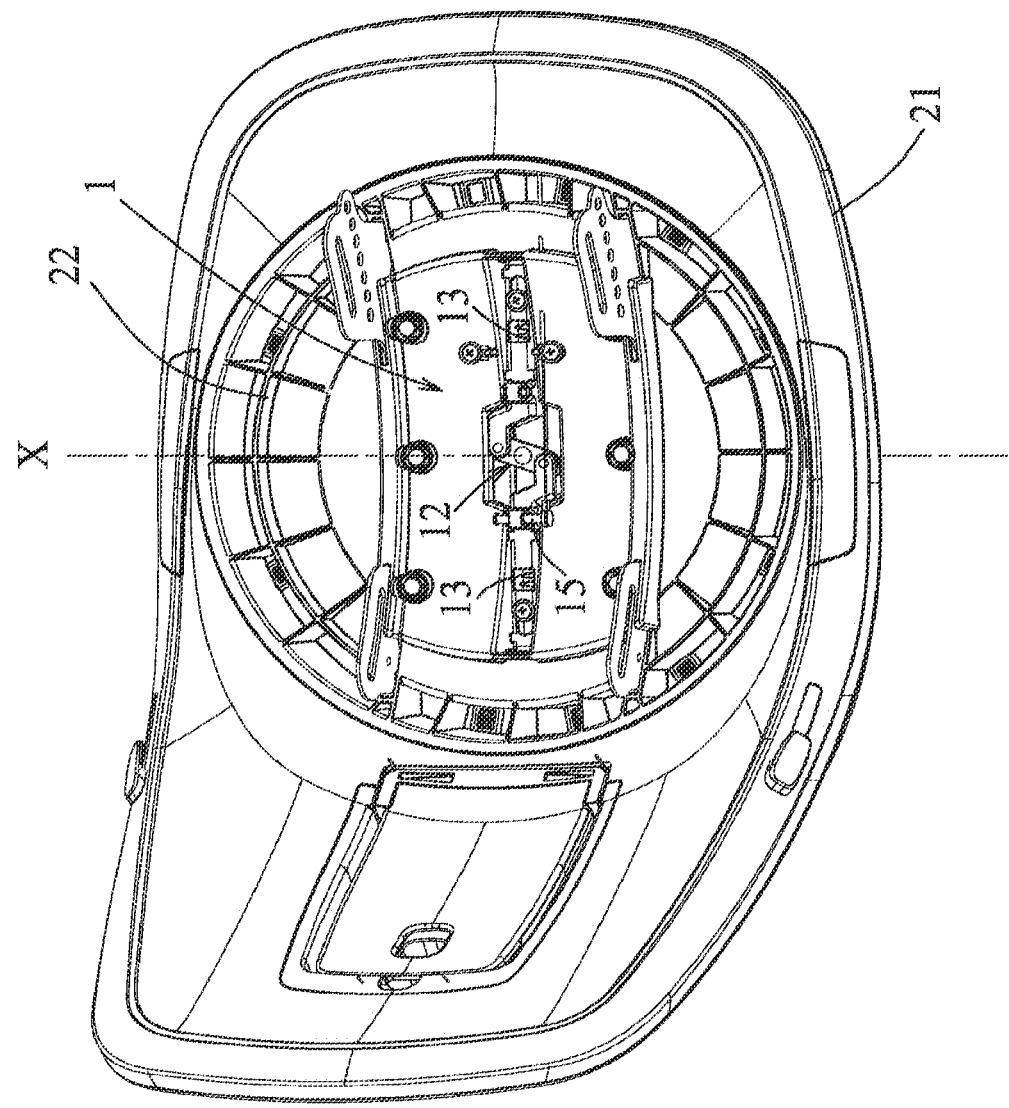
FIG. 2 is a fragmentary perspective view of a mid base and a base member of the embodiment.
Figure 3:
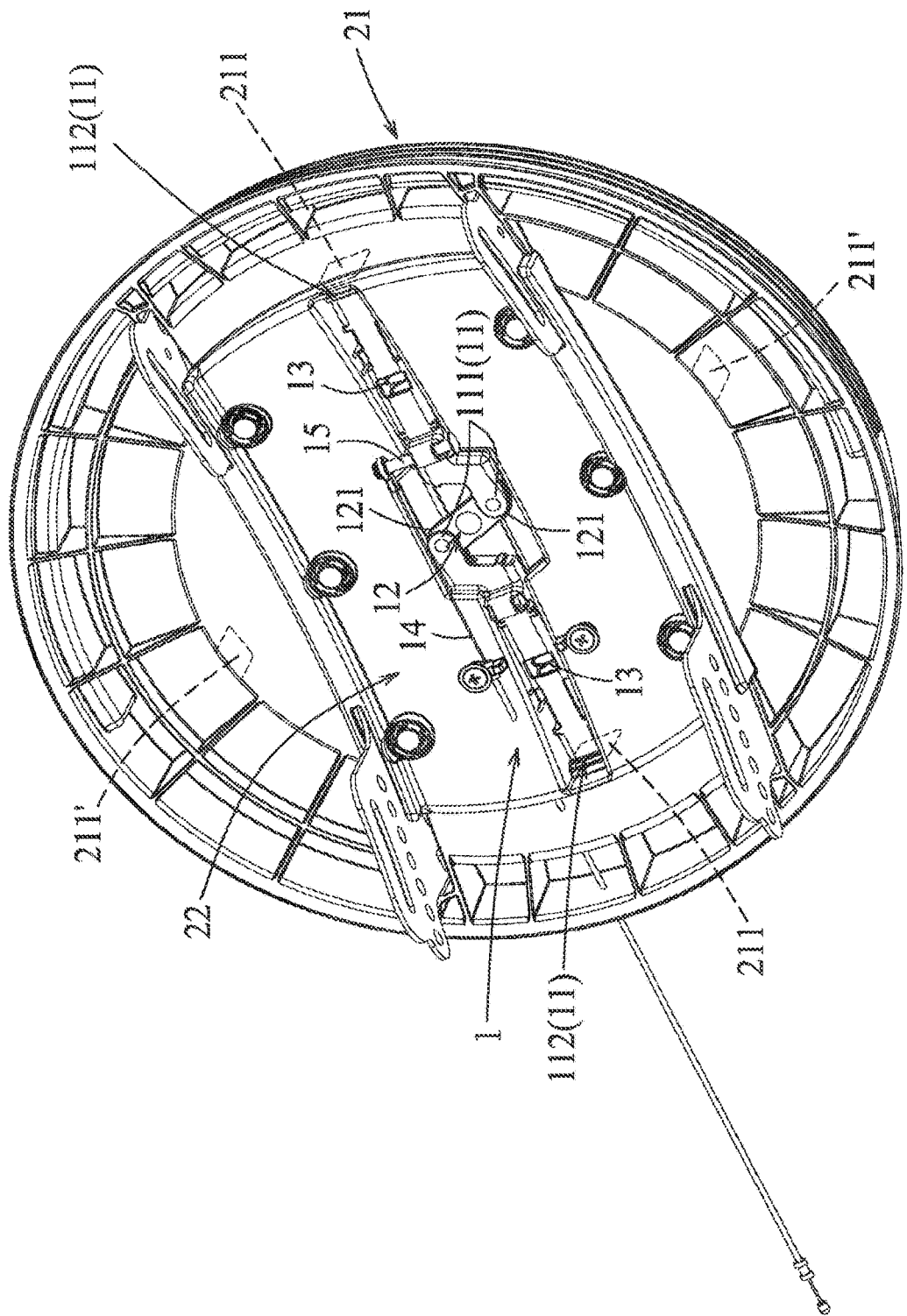
FIG. 3 is a fragmentary cutaway perspective view of the embodiment, illustrating two locking components of a child restraint spin lock at a locked position.

Referring to FIGS. 1, 2 and 3, an embodiment of a safety seat of a vehicle (not shown) includes a child restraint spin lock 1 and a seat unit 2. The seat unit 2 includes a base member 21, a mid base 22 and a seat member 23.

The mid base 22 is mounted to the base member 21, and is rotatable relative to the base member 21 about an axis (X). The base member 21 has two first lock sections 211 (see FIG. 5) that are spaced apart from each other, and two second lock sections 211' that are spaced apart from each other. In this embodiment, the first lock sections 211 are respectively disposed on opposite sides of the axis (X), the second lock sections 211' are respectively disposed on opposite sides of the axis (X), and the first and second lock sections 211, 211' are alternately arranged. That is, the first lock sections 211 (or second lock sections 211') define an angle of 180 degrees with the axis (X) serving as the vertex of the angle. In the present embodiment, the first and second lock sections 211, 211' are configured as slots.

It should be noted that, the first and second lock sections 211, 211' are not limited to the above configurations. For example, in another embodiment of the disclosure, the first or second lock sections 211, 211' may be disposed in a manner that they define an angle of 90 degrees.

The seat member 23 is mounted at op the mid base 22, is co-rotatable with the mid base 22 about the axis (X), and includes an operating component 231 that is exposed to the external environment, and that serves as a manual actuator for the child restraint spin lock 1. It should be noted that, the operating component 231 is not limited to the present configuration. For example, in other embodiments of the disclosure, the operating component 231 may be mounted to the base member 21 instead of the seat member 23.

Figure 4:
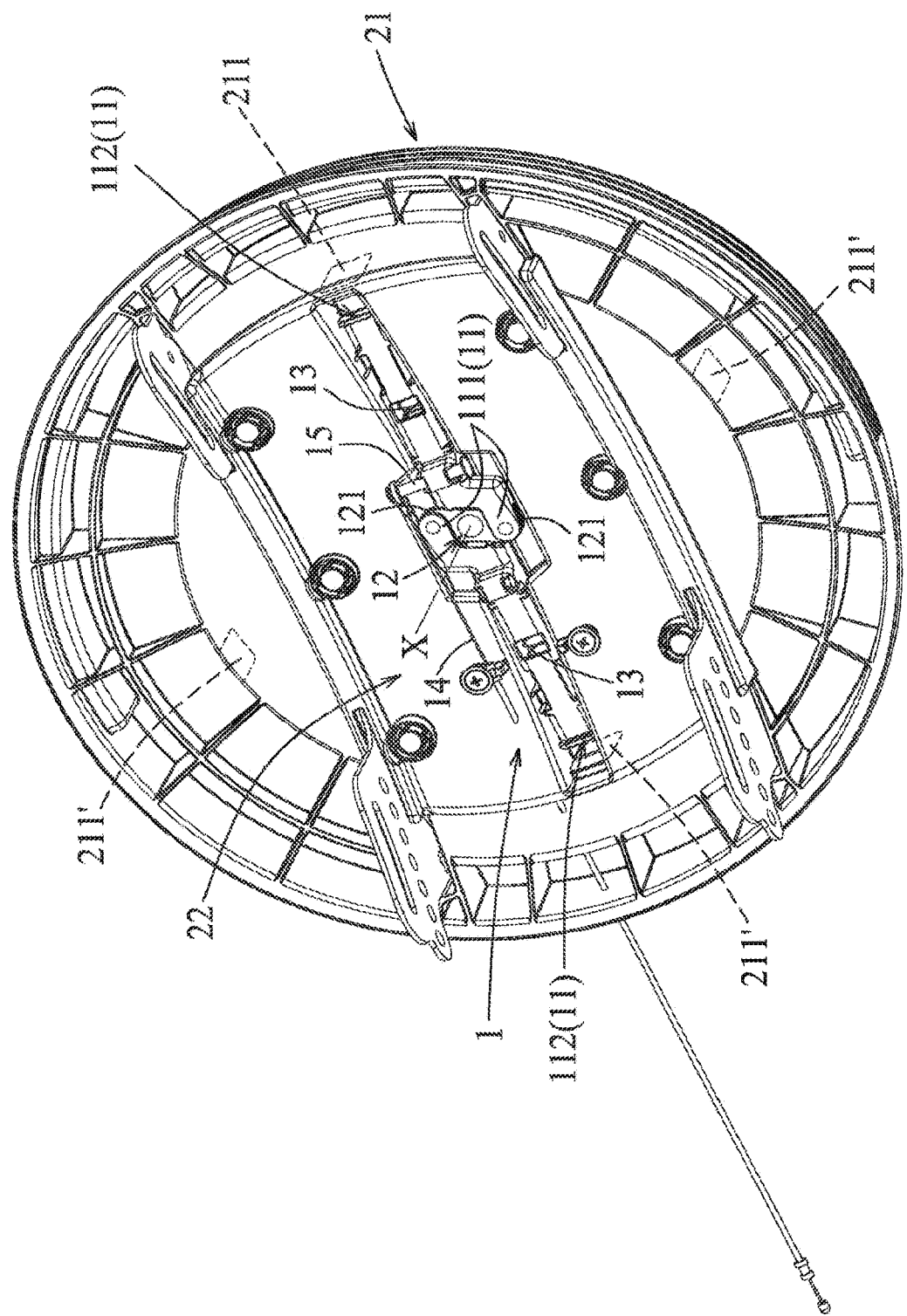
FIG. 4 is another fragmentary cutaway view of the embodiment, illustrating the locking components of the child restraint spin lock at an unlocked position.
Figure 5:
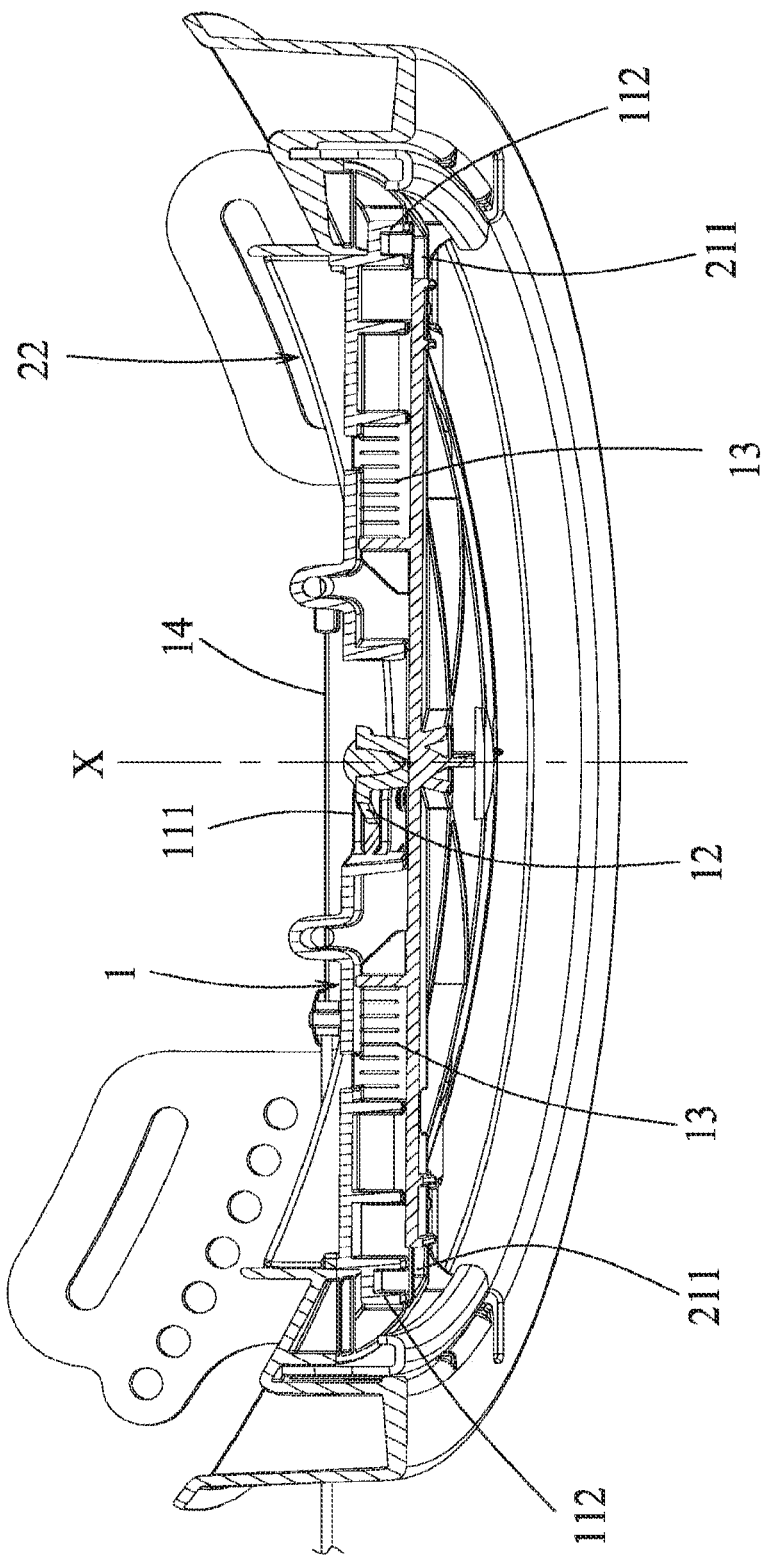
FIG. 5 is another fragmentary cutaway perspective view of the embodiment, illustrating the locking components of the child restraint spin lock at the locked position.

Referring further to FIGS. 4 and 5, the child restraint spin lock 1 is installed in the seat unit 2 between the base member 21 and the mid base 22 of the seat unit 2, and includes two locking components 11, a pivot component 12, two resilient members 13, a linking member 14 and a connecting pin 15.

The locking components 11 of the child restraint spin lock 1 are co-rotatably connected to the mid base 22, are spaced apart from each other. In this embodiment, the locking components 11 are respectively disposed on opposite sides of the axis (X).

Each of the locking components 11 has a first end portion 111 and a second end portion 112 that are respectively proximate to and distal from the axis (X), and is movable relative to the base member 21 between a locked position (see FIG. 3) and an unlocked position (see FIG. 4). It should be noted that, FIGS. 3 and 4 only show the locked and unlocked positions of the locking components 11 with respect to the first lock sections 211 of the base member 21; the locked and unlocked positions with respect to the second lock sections 211' are not shown in the figures but can be inferred therefrom.

When each of the locking components 11 is at the locked position, the second end portion 112 of each of the locking components 11 is engaged with (i.e. received in) a respective one of the first lock sections 211 of the base member 21, such that the mid base 22 is not allowed to rotate relative to the base member 21.

Conversely, when each of the locking components 11 is at the unlocked position, the second end portion 112 of each of the locking components 11 is disengaged from the respective one of the first lock sections 211 of the base member 21 so that the mid base 22 can be rotated relative to the base member 21, thereby driving rotation of the seat member 23.

It should be noted that, when the locking components 11 are engaged with the first lock sections 211 of the base member 21 as shown in FIG. 3, the seat member 23 is secured at, for example, a forward facing position (see FIG. 1). And since the first lock sections 211 are disposed on opposite sides of the axis (X) in the present embodiment, when the locking components 11 are operated to the unlocked position and the seat member 23 is rotated to a rear facing position (not shown) that is 180 degrees from the forward facing position, the locking components 11 will still be engageable with the first lock sections 211 of the base member 21 to secure the seat member 23 at the rear facing position.

Similarly, since the second lock sections 211' are disposed on opposite sides of the axis (X) in the present embodiment, when the locking components 11 are engaged with the second lock sections 211' of the base member 21, the seat member 23 is at one of two intermediate positions (not shown) which are 180 degrees different from each other.

It should also be noted that, the locking components 11 are not limited to be disposed on opposite sides of the axis (X) For example, in another embodiment of the disclosure, the locking components 11 may be perpendicular to each other and be arranged in an L-shape, and as mentioned above, the first lock sections 211 (or the second lock sections 211') may be configured in a manner that they define an angle of 90 degrees, such that they can be engaged respectively with the locking components 11 arranged in an L-shape.

The pivot component 12 is connected to the mid base 22, is rotatable relative to the mid base 22 about the axis (X), and has two end segments 121. In the present embodiment, the end segments 121 of the pivot component 12 are respectively disposed on opposite sides of the axis (X), but are not limited thereto.

Each of the end segments 121 is pivotally connected to the first end portion 111 of a respective one of the locking components 11 such that movements of the locking components 11 from the locked position to the unlocked position are synchronized by rotation of the pivot component 12 about the axis (X).

As shown in FIG. 5, each of the resilient members 13 is mounted between the mid base 22 and a respective one of the locking components 11. Specifically, each of the resilient members 13 has one end that abuts against the respective one of the locking components 11, and the other end that abuts against the mid base 22 for biasing the respective one of the locking components 11 toward the locked position.

It should be noted that, in other embodiments of the disclosure, the child restraint spin lock 1 may include only one resilient member 13 that is mounted to one of the locking components 11. Since the movements of the locking components 11 are synchronized by the pivot component 12, such configuration will provide the same functionality.

The connecting pin 15 is mounted to one of the locking components 11. The linking member 14 is connected to the one of the locking components 11 via the connecting pin 15, and is operable for driving movement of the one of the locking components 11 from the locked position to the unlocked position to result in synchronous movement of the other one of the locking components 11 via the rotation of the pivot component 12 about the axis (X). The linking member 14 is further connected to the operating component 231 of the seat member 23 such that a user may manually actuate the operation of the linking member 14 via the operating component 231.

In the present embodiment, the child restraint spin lock 1 includes only one linking member 14 that is configured as a flexible cable. However, in another embodiment of the disclosure, the child restraint spin lock 1 may include two linking members 14 that are connected to opposite ends of the connecting pin 15, and the linking members 14 may be configured as rigid links.

During operation of the child restraint spin lock 1, in the event that the seat member 23 is originally positioned in the forward facing position where the locking components 11 are engaged with the first lock sections 211 of the base member 12, a user may interact with the operating component 231 to actuate the linking member 14 to move the locking components 11.

When the locking components 11 are moved to the unlocked position with the second end portions 112 being respectively disengaged from the first lock sections 211 of the base member 21, the user is all owed to rotate the seat member 23 (and to co-rotate the mid base 22) to change orientation of the seat member 23. When the seat member 23 is rotated to one of the intermediate positions, the locking components 11 are operable to engage the second end portions 112 respectively with the second lock sections 211' for positioning the mid base 22 relative to the base member 21 (or to the rear facing position, where the locking components 11 are operable to engage the second end portions 112 respectively with the first lock sections 211 again).

It should be noted that, by virtue of the disposition of the resilient member 13, the user does not need to interact with the operating component 231 to move the locking components 11 from the unlocked position to the locked posit ion. Once the seat member 23 is rotated to any of the rear facing, forward facing and intermediate positions, the resilient member 13 will automatically push the locking components 11 to be engaged with the corresponding first or second lock sections 211, 211'. The above-mentioned process is applicable in rotating the seat member 23 from any of the rear facing, forward facing and intermediate positions to another.

It should also be noted that, in the present embodiment, a total number of the first and second lock sections 211, 211' is four. However, this number may vary in other embodiments of the disclosure to provide the user more options for positioning the seat member 23, depending on actual needs.

In sum, the present embodiment of the disclosure has advantages as follows.

By virtue of the disposition of the pivot component 12, the movements of the locking components 11 are synchronized in a straightforward fashion via two pivotal connections among the locking components 11 and the pivot component 12, without involving overly complex mechanisms. Such configuration requires less maintenance than that of the prior arts.

Also, compared with a single lock mechanism, the oppositely disposed locking components 11 are able to provide better retention, and are less susceptible to disengagement by crash forces.

Moreover, the present embodiment provides the user the options to position the seat member 23 in different orientations for different needs and circumstances.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A safety seat comprising:
   a first base;
   a second base positioned on the first base and rotatable relative to the first base about an axis;
   a seat positioned on the second base and rotatable relative to the first base about the axis;
   a lock disposed on the second base, the lock comprising a movable lock component configured to lock the first base with the second base;
   an actuator configured to disengage the movable lock component from the first base and permit the second base to rotate relative to the first base; and
   a link comprising a first end and a second end, the link extending between the movable lock component and the actuator,
   wherein
   the first end and the movable lock component are directly connected to each other forming a direct connection,
   the link does not comprise a rotatable connection at the axis, and
   the second end contacts the actuator.

2. The safety seat of claim 1, wherein the movable lock component locks the first base with the second base preventing rotation of the second base relative to the first base about the axis.

3. The safety seat of claim 1, wherein the first base comprises a first opening positioned to receive the movable lock component for a locked position, the first base comprises a second opening positioned to receive the movable lock component for a second locked position, the locked position provides the seat in a forward-facing configuration, and the second locked position provides the seat in a rear-facing configuration.

4. The safety seat of claim 3, wherein the first base further comprises a third opening and a fourth opening, and the third opening and the fourth opening are positioned 90 degrees about the axis from the first opening.

5. The safety seat of claim 1, wherein the movable lock component comprises a first portion and a second portion, and the first portion contacts the link and the second portion prevents rotation of the first base relative to the second base for a locked position.

6. The safety seat of claim 1, further comprising a spring positioned to bias the movable lock component to a locked position.

7. The safety seat of claim 6, wherein the actuator is configured to compress the spring for an unlocked position.

8. The safety seat of claim 1, wherein the link is a cable.

9. The safety seat of claim 1, wherein the first end of the link and the movable lock component are directly connected by a connecting pin.

10. The safety seat of claim 1, wherein the second end contacts to the actuator by an integral connection.

11. The safety seat of claim 9, wherein the connecting pin is positioned between the first end of the link and the movable lock component.

12. The safety seat of claim 1, further comprising a spring positioned to contact the movable lock component.

13. The safety seat of claim 1, further comprising: a second movable lock component configured to lock the first base with the second base; and a pivot component operatively connected between the movable lock component and the second movable lock component, wherein the pivot component translates movement of the movable lock component to the second movable lock component.

14. The safety seat of claim 1, further comprising a second link positioned to contact the movable lock component.

15. A safety seat comprising:
   a first base;
   a second base positioned on the first base and rotatable relative to the first base about an axis;
   a seat positioned on the second base and rotatable relative to the first base about the axis;
   a lock disposed on the second base, the lock comprising a movable lock component configured to lock the first base with the second base;

an actuator configured to disengage the movable lock component from the first base and permit the second base to rotate relative to the first base; and a cable comprising a first end and a second end, the cable extending between the movable lock component and the actuator, wherein
- the first end and the movable lock component are directly connected to each other forming a direct connection,
- the cable does not comprise a rotatable connection at the axis, and
- the second end is connected to the actuator.

16. The safety seat of claim 15, wherein the movable lock component locks the first base with the second base preventing rotation of the second base relative to the first base about the axis.

17. The safety seat of claim 15, wherein the first base comprises a first opening positioned to receive the movable lock component for a locked position, the first base comprises a second opening positioned to receive the movable lock component for a second locked position, the locked position provides the seat in a forward-facing configuration, and the second locked position provides the seat in a rear-facing configuration.

18. The safety seat of claim 17, wherein the first base further comprises a third opening and a fourth opening, and the third opening and the fourth opening are positioned 90 degrees about the axis from the first opening.

19. The safety seat of claim 15, wherein the movable lock component comprises a first portion and a second portion, and the first portion is directly connected to the cable and the second portion prevents rotation of the first base relative to the second base for a locked position.

20. The safety seat of claim 15, further comprising a spring positioned to bias the movable lock component to a locked position.

21. The safety seat of claim 20, wherein the actuator is configured to compress the spring for an unlocked position.

22. The safety seat of claim 15, wherein the first end is directly connected to the movable lock component by a connecting pin.

23. The safety seat of claim 15, further comprising a spring positioned to contact the movable lock component.

24. The safety seat of claim 15, further comprising:
a second movable lock component configured to lock the first base with the second base; and
a pivot component operatively connected between the movable lock component and the second movable lock component, wherein the pivot component translates movement of the movable lock component to the second movable lock component.

25. The safety seat of claim 15, further comprising a second cable directly connected to the movable lock component.

26. A safety seat comprising:
a first base;
a second base comprising an inner region and an extension region extending radially outward of the inner region, the extension region disposed on the first base and rotatable relative to the first base about an axis;
a seat positioned on the second base and rotatable relative to the first base about the axis;
a lock disposed on the second base, the lock comprising a movable lock component configured to lock the first base with the second base at a position radially inward of the extension region of the second base, wherein the locking of the first base with the second base prevents rotation of the second base relative to the first base about the axis;
an actuator configured to disengage the movable lock component from the first base and permit the second base to rotate relative to the first base; and
a link comprising a first end and a second end, the link extending between the movable lock component and the actuator, wherein
- the link does not comprise a rotatable connection at the axis,
- the first end and movable lock component are connected by a one to one force connection, and
- the second end contacts the actuator.

27. The safety seat of claim 26, wherein the link is a cable.

28. The safety seat of claim 26, wherein the one to one force connection between the first end of the link and the movable lock component is provided by a connecting pin.

29. The safety seat of claim 28, wherein the connecting pin is positioned between the first end of the link and the movable lock component.

30. The safety seat of claim 26, further comprising a spring positioned to contact the movable lock component.

* * * * *